US009874378B2

(12) United States Patent
Kopko

(10) Patent No.: US 9,874,378 B2
(45) Date of Patent: Jan. 23, 2018

(54) REFRIGERATION SYSTEM WITH FREE-COOLING

(71) Applicant: Johnson Controls Technology Company, Plymouth, MI (US)

(72) Inventor: William L. Kopko, Jacobus, PA (US)

(73) Assignee: Johnson Controls Technology Company, Milwaukee, WI (US)

( * ) Notice: Subject to any disclaimer, the term of this patent is extended or adjusted under 35 U.S.C. 154(b) by 0 days.

(21) Appl. No.: 15/414,444

(22) Filed: Jan. 24, 2017

(65) Prior Publication Data
US 2017/0131003 A1 May 11, 2017

Related U.S. Application Data

(62) Division of application No. 14/205,829, filed on Mar. 12, 2014, now Pat. No. 9,581,364.

(60) Provisional application No. 61/791,193, filed on Mar. 15, 2013.

(51) Int. Cl.
*F25B 27/00* (2006.01)
*F25B 25/00* (2006.01)
*F25B 49/02* (2006.01)
*F25B 41/04* (2006.01)

(52) U.S. Cl.
CPC ............ *F25B 25/005* (2013.01); *F25B 41/04* (2013.01); *F25B 49/02* (2013.01); *F25B 2400/06* (2013.01); *F25B 2500/31* (2013.01); *F25B 2700/2106* (2013.01)

(58) Field of Classification Search
CPC .................... F25B 25/005; F25B 49/02; F25B 2700/2106; F25B 2500/31; F25B 2400/06
See application file for complete search history.

(56) References Cited

U.S. PATENT DOCUMENTS

| 2,244,312 A | 6/1941 | Newton |
| 4,406,138 A | 9/1983 | Nelson |
| 5,263,892 A | 11/1993 | Vandervaart |
| (Continued) | | |

FOREIGN PATENT DOCUMENTS

| CN | 101520218 A | 9/2009 | |
| JP | 2012149782 A | 8/2012 | |
| WO | WO 2011019909 A1 * | 2/2011 | ............ F25B 25/005 |

OTHER PUBLICATIONS

Chinese Office Action for CN Application No. 201410099040.6 dated May 31, 2017, 10 Pages.

Primary Examiner — Len Tran
Assistant Examiner — Ana Vazquez
(74) Attorney, Agent, or Firm — Fletcher Yoder, P.C.

(57) ABSTRACT

A system for cooling air for use with a liquid cooling fluid loop. The system includes a first refrigerant circuit with an air-cooled condenser, a second refrigerant circuit with a liquid-cooled condenser, and a free-cooling loop. A control device is provided for controlling the operation of the system between a first mode, a second mode, and a third mode. When operating in the first mode, only the free-cooling loop cooperates directly with liquid cooling fluid in the liquid cooling fluid loop to cool the liquid cooling fluid, when operating in the second mode, the second refrigerant circuit is not engaged, and when operating in the third mode, the free-cooling loop interacts with the second refrigerant circuit to reject heat of the second refrigerant circuit through the free-cooling loop.

8 Claims, 3 Drawing Sheets

(56) References Cited

U.S. PATENT DOCUMENTS

| | | |
|---|---|---|
| 7,036,330 B2 | 5/2006 | Grabon et al. |
| 7,913,506 B2 | 3/2011 | Bittner et al. |
| 2011/0192188 A1 | 8/2011 | Nickey et al. |
| 2012/0125023 A1 | 5/2012 | Kopko et al. |

\* cited by examiner

REFRIGERATION SYSTEM WITH FREE-COOLING

CROSS-REFERENCE TO RELATED APPLICATION

This application is a division of U.S. patent application Ser. No. 14/205,829 filed Mar. 12, 2014, entitled "REFRIGERATION SYSTEM WITH FREE-COOLING," which claims priority to U.S. Provisional Application Ser. No. 61/791,193 filed Mar. 15, 2013, entitled "HEAT EXCHANGER WITH FREE-COOLING," which are hereby incorporated by reference in their entirety.

FIELD

The invention relates generally to a refrigeration system with free-cooling cooling. In particular, the invention relates to free-cooling systems which when operating in free-cooling mode the free-cooling loop can directly cool the liquid cooling fluid and when operating in full mechanical cooling mode the free cooling loop can reject heat from a second refrigerant circuit used to cool the cooling fluid.

BACKGROUND

Many applications exist for refrigeration systems including residential, commercial, and industrial applications. For example, a commercial refrigeration system may be used to cool an enclosed space such as a data center, laboratory, supermarket, or freezer. Very generally, refrigeration systems may include circulating a fluid through a closed loop between an evaporator where the fluid absorbs heat and a condenser where the fluid releases heat. The fluid flowing within the closed loop is generally formulated to undergo phase changes within the normal operating temperatures and pressures of the system so that considerable quantities of heat can be exchanged by virtue of the latent heat of condensation and vaporization of the fluid.

Refrigeration systems may operate with a free-cooling system or loop when ambient temperatures are low. The free-cooling system may exploit the low temperature of the ambient air to provide cooling without the need for an additional energy input from, for example, a compressor, a thermoelectric device, or a heat source. Typically, free-cooling systems may employ a separate heat exchanger or portion of a heat exchanger coil when operating in a free-cooling mode. When free-cooling is not desired, or feasible, the separate heat exchanger or coil portion may not be utilized.

In an air-cooled condenser, the refrigerant flowing through the condenser can exchange heat with circulating air generated by an air moving device such as a fan or blower. Since circulating air is used for heat exchange in an air-cooled condenser, the performance and efficiency of the condenser, and ultimately the HVAC&R system, is subject to the ambient temperature of the air that is being circulated through the condenser. As the ambient air temperature increases, the condensing temperature (and pressure) of the refrigerant in the condenser also increases. At very high ambient air temperatures, i.e., air temperatures greater than 110 degrees Fahrenheit (° F.), the performance and efficiency of the HVAC&R system can decrease due to higher condensing temperatures (and pressures) caused by the very high ambient air temperatures.

Some projects require chilled water year round (data centers, process applications) at a relatively warm chilled water temperature (between 7° C. and 15° C.). When ambient temperature is lower than required chilled water temperatures, free-cooling becomes a more efficient solution than mechanical cooling. It would be beneficial for a free-cooling option to offer the possibility to operate the chiller in mechanical cooling mode with no loss of efficiency, allowing the free cooling loop to draw heat from a mechanical refrigeration loop. It would also be beneficial to use the free-cooling loop as the unique source of cooling when working in free-cooling only mode.

SUMMARY

An embodiment is directed to a system for cooling air for use with a liquid cooling fluid loop. The system includes a first refrigerant circuit with an first condenser, a second refrigerant circuit with a second condenser, and a free-cooling loop. A control device is provided for controlling the operation of the system between first mode, a second mode, and a third mode. When operating in the first mode, only the free-cooling loop cooperates directly with liquid cooling fluid in the liquid cooling fluid loop to cool the liquid cooling fluid, when operating in the second mode, the second refrigerant circuit is not engaged, and when operating in the third mode, the free-cooling loop interacts with the second refrigerant circuit to reject heat of the second refrigerant circuit through the free-cooling loop.

An embodiment is directed to a system for cooling air for use with a liquid cooling fluid loop. The system includes a first refrigerant circuit with an first condenser, a second refrigerant circuit with a second condenser, and a free-cooling loop with a valve that directs free-cooling liquid of the free-cooling loop. A control device is provided for controlling the operation of the system between a free-cooling-only mode, a free-cooling-plus-mechanical-cooling mode, and a full mechanical cooling mode. When operating in the free-cooling-only mode, the valve directs the free-cooling liquid to a heat exchanger which is positioned in-line with the liquid cooling fluid loop, and when operating in the full mechanical cooling mode the valve directs free-cooling liquid to the liquid-cooled condenser of the second refrigerant circuit.

An embodiment is directed to a refrigeration system for use with a liquid cooling fluid loop. The refrigeration system includes a first refrigerant circuit with a first condenser, a second refrigerant circuit with a second condenser and a free-cooling loop with free-cooling liquid. A control device is provided for controlling the operation of the system between a free-cooling-only mode, a free-cooling-plus-mechanical-cooling cooling mode and a full mechanical cooling mode. A heat exchanger cooperates with the free-cooling loop and the liquid cooling fluid loop. A cooler cooperates with the first refrigerant circuit, the second refrigerant circuit and the liquid cooling fluid loop. When operating in the free-cooling-only mode, the free-cooling liquid is directed to a heat exchanger and when operating in the full mechanical cooling mode the free-cooling liquid is directed to the second condenser.

In some embodiments the first condenser of the first refrigerant circuit is an air-cooled condenser. In some embodiments the second condenser of the second refrigerant circuit is a liquid-cooled condenser.

An advantage of the present application is a system which is compatible with water or other cooling fluids in the building loop.

Another advantage of the present application is increased system capacity at very high ambient air temperatures.

Still another advantage of the present application is the system can operate in a regular cooling mode (with no free-cooling) with no decrease in efficiency and no other penalties.

A further advantage of the present application is the ability to use small pump power to provide efficient cooling.

Yet a further advantage of the present application is the system requires no new heat exchangers and can be used with no change in footprint from existing systems.

Other advantages of the present application will be apparent from the drawings and the detailed description of the illustrative embodiments provided below.

DETAILED DESCRIPTION OF THE ILLUSTRATIVE EMBODIMENTS

Figure 1:
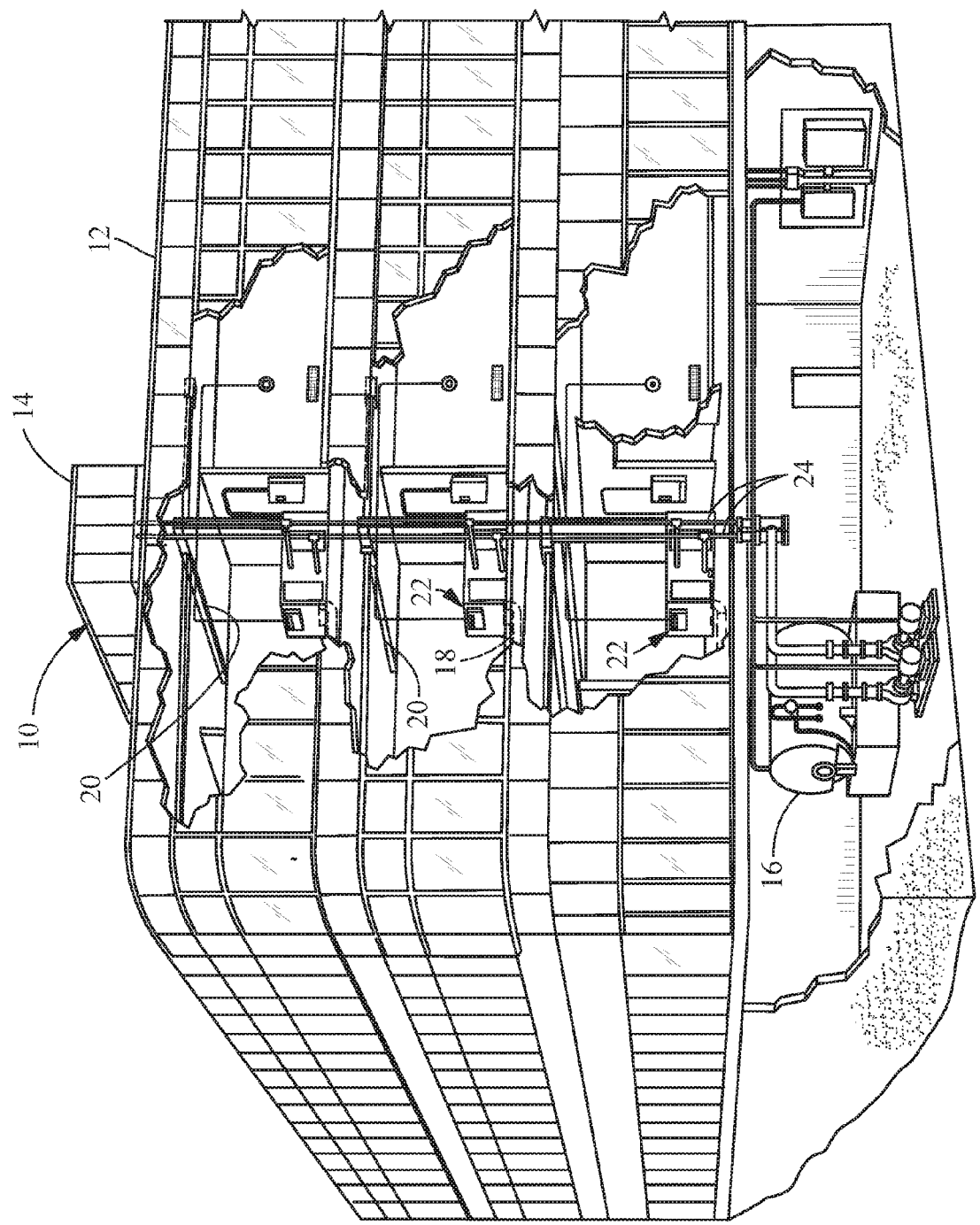
FIG. 1 shows an illustrative embodiment for a heating, ventilation, air conditioning and refrigeration system.

Referring to FIG. 1, an illustrative environment for a heating, ventilation, air conditioning and refrigeration (HVAC&R) system 10 in a building 12 for a typical commercial setting is shown. HVAC&R systems 10 may include a compressor incorporated into a chiller or rooftop unit 14 that may supply a chilled liquid that may be used to cool building 12. HVAC&R system 10 may also include a boiler 16 to supply a heated liquid that may be used to heat building 12, and an air distribution system that circulates air through building 12. The air distribution system may include an air return duct 18, an air supply duct 20 and an air handler 22. Air handler 22 may include a heat exchanger (not shown) that is connected to boiler 16 and rooftop unit 14 by conduits 24. The heat exchanger (not shown) in air handler 22 may receive either heated liquid from boiler 16 or chilled liquid from rooftop unit 14 depending on the mode of operation of HVAC&R system 10. HVAC&R system 10 is shown with a separate air handler 22 on each floor of building 12. However, several air handlers 22 may service more than one floor, or one air handler may service all of the floors.

Figure 2:
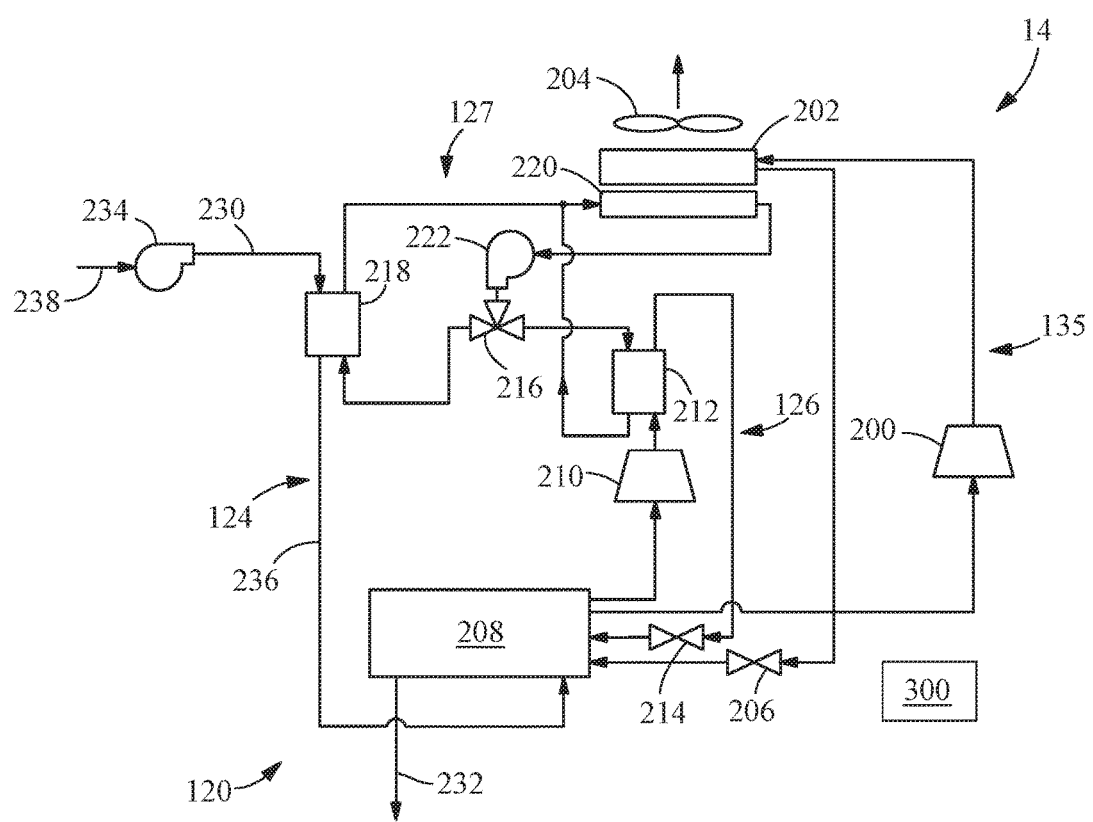
FIG. 2 illustrates an illustrative free-cooling system with two refrigerant circuits and a glycol loop.

As shown in FIG. 2, the chiller 14 includes a cooling system 120 which includes a first refrigerant circuit 135, a second refrigerant circuit 126, and a free-cooling loop or glycol loop 127. As noted above with respect to FIG. 1, chiller 14 is housed within a single structure and may be located outside of a building or environment, for example on a roof top. Chiller 14 includes a portion of a liquid cooling fluid loop 124 that circulates a liquid cooling fluid, such as chilled water, an ethylene glycol-water solution, or propylene glycol-water solution, brine, or the like, to a cooling load, such as a building, piece of equipment, or environment. In certain embodiments, the liquid cooling fluid may circulate within the liquid cooling fluid loop 124 to a cooling load, such as a research laboratory, computer room, office building, hospital, molding and extrusion plant, food processing plant, industrial facility, machine, or any other environments or devices in need of cooling.

The first refrigerant circuit 135 includes a first compressor 200, an air-cooled condenser or condenser coil 202, an expansion device 206, and a cooler 208 which cools chilled water. The cooler 208 cools the fluid in the liquid cooling fluid loop 124. The cooler 208 includes two evaporators, one which is positioned in the first refrigerant circuit 135 and one which is positioned in the second refrigerant circuit 126.

The second refrigerant circuit 126 includes a second compressor 210 which supplies pressurized refrigerant vapor to a condenser 212. The condenser 212 cools and condenses the refrigerant. High pressure liquid refrigerant flows through an expansion device 214 where it is converted to low pressure fluid, usually in the form of gas/liquid mixture, or mist. The cooler 208 cools the fluid in the liquid cooling fluid loop 124 as the low pressure fluid evaporates, absorbing heat from the fluid in the liquid cooling fluid loop 124.

The free-cooling loop or glycol loop 127 includes a glycol coil 220, a glycol pump 222, and a three-way valve 216 that connects the outlet of the pump 222 to either a glycol-water heat exchanger 218 or the condenser 212. A fan 204 moves air through the glycol coil 220 and the condenser coil 202. The glycol coil 220 is located upstream of the condenser coil 202 of the first refrigerant circuit 135.

The liquid cooling fluid loop 124 includes a second pump 234 which moves return fluid 230 through the glycol-water heat exchanger 218. The chilled water 236 which exits the heat exchanger 218 flows from the glycol-water heat exchanger 218 through the cooler 208 to become supply fluid 232 for the liquid cooling fluid loop 124.

In one illustrative embodiment, the air-cooled heat exchanger or condenser which includes the condenser coil 202 and the glycol coil 220 can be set up, configured or arranged to have one or more portions with substantially planar sections or coils arranged or positioned in a V-shape. The sections or coils can be stacked or nested and operated at different condensing temperatures, condensing pressure and/or in different refrigerant circuits. The stacked sections or coils can be arranged or positioned so that the air exiting one section or coil enters the other section or coil. Stated differently, the air flow through the sections or coils of the portion of the condenser can be in a series configuration or arrangement. In another illustrative embodiment, the condenser may have portions with both stacked sections and coils operating at different condensing temperatures or pressures and single sections or coils operating at a single condensing temperature or pressure.

In one illustrative embodiment, the condenser coil 202 and/or the glycol coil 220 can be implemented with microchannel or multichannel coils or heat exchangers. Microchannel or multichannel coils can have the advantage of compact size, light weight, low air-side pressure drop, and low material cost. The microchannel or multichannel coils or sections can circulate refrigerant through two or more tube sections, each of which has two more tubes, passageways or channels for the flow of refrigerant. The tube section can have a cross-sectional shape in the form of a rectangle, parallelogram, trapezoid, ellipse, oval or other similar geometric shape. The tubes in the tube section can have a cross-sectional shape in the form of a rectangle, square, circle, oval, ellipse, triangle, trapezoid, parallelogram or other suitable geometric shape. In one embodiment, the tubes in the tube section can have a size, e.g., width or diameter, of between about a half (0.5) millimeter (mm) to about a three (3) millimeters (mm). In another embodiment, the tubes in the tube section can have a size, e.g., width or diameter, of about one (1) millimeter (mm).

In another illustrative embodiment, the condenser coil 202 and/or the glycol coil 220 can be implemented with round-tube plate-fin coils. One illustrative configuration for round-tube plate-fin coils is to split the fins so that there is no conduction path between the two refrigerant circuits or coils, but to use a common tube sheet. The result is two separate coils from a thermal standpoint, but mechanically they appear as a single unit. Another illustrative configuration is to make a round-tube coil where the refrigerant circuits share the fins. However, there may be conduction through the fins between the two circuits or coils that may be limited by the inclusion of a thermal break (such as a slit) in the fin design. In still another illustrative embodiment, the round-tube coil condensers can be configured to have the desuperheating sections downstream of both condensing sections and the subcooling sections upstream of both condensing sections to provide the optimum thermal performance.

The glycol loop 127 is separate from the liquid cooling fluid loop 124, thereby allowing the glycol or other fluid having similar properties to be exposed to the ambient air to be independent from the liquid cooling fluid circulating within liquid cooling fluid loop 124. In general, the fluid circulating within glycol loop 127 may have a lower freezing point temperature than the liquid cooling fluid circulating within liquid cooling fluid loop 124. In certain embodiments, the fluid circulating within glycol loop 127 is a freeze-protected fluid, such as glycol or brine with a high glycol concentration, to inhibit freezing during periods of low ambient temperatures. However, freeze-protected fluids may have a higher cost, higher viscosity (which may result in increased pumping power), and/or a lower heat transfer rate when compared to other cooling fluids, such as water. By circulating the freeze-protected fluid through a relatively small glycol loop 127, a relatively small amount of freeze-protected fluid may be employed, which in turn may improve efficiency of chiller 14 and/or reduce costs.

The cooling system 120 may operate in different modes of operation depending on the requirements of the cooling load and the temperature of the ambient air. A control device 300 may govern operation of chiller 14 and cooling system 120 to cool the fluid within the liquid cooling fluid loop 124 to a prescribed temperature or prescribed range of temperatures. For example, control device 300 may switch cooling system 120 between a free-cooling mode, a conventional cooling mode and a full mechanical cooling mode.

When the outside air temperature is low, for example, during winter in northern climates and equivalent seasons in the southern hemisphere, cooling system 120 may operate in a first mode or free-cooling mode. In this mode of operation, the second refrigerant circuit 126 does not operate. The three-way valve 216 of the glycol loop 127 is positioned to direct glycol to the glycol-water heat exchanger 218. In this mode, heat from the liquid cooling fluid 230 in the liquid cooling fluid loop 124 is transferred to the glycol or freeze-protected fluid circulating within the glycol loop 127. The glycol loop 127 then circulates the freeze-protected fluid through glycol coil 220 to expel the heat to the low temperature outdoor air.

The cooling system 120 may operate in the first mode, or free-cooling-only mode, of operation when the ambient air temperature is sufficiently low enough to provide free-cooling. For example, chiller 14 may operate in the free-cooling-only mode during the winter when outside temperatures are below approximately 15 degrees Celsius. However, in other embodiments, the cooling mode determination may depend on a variety of factors such as the cooling requirement of the cooling load, the outside temperature and/or humidity, the type of cooling fluid, and the cooling capacity of the chiller 14 among other things.

In a second mode or free-cooling-plus-mechanical-cooling cooling mode, the first refrigerant circuit 135 may operate to supply additional mechanical cooling if required. If needed, the first refrigerant circuit 135 runs as a conventional refrigeration system.

In this second mode of operation, the liquid cooling fluid may first be cooled by the freeze-protected fluid as the liquid cooling fluid circulates. Specifically, as the liquid cooling fluid 230 of the liquid cooling fluid loop 124 flows through heat exchanger 218, the liquid cooling fluid 230 may transfer heat to the freeze-protected fluid flowing through heat exchanger 218 from the glycol loop 127. After exiting the heat exchanger the liquid cooling fluid 236 may undergo further cooling by transferring heat to a refrigerant flowing within the first refrigerant circuit 135. Specifically, as the liquid cooling fluid 236 flows through the cooler 208, the liquid cooling fluid 236 may transfer heat to the refrigerant flowing within first refrigerant circuit 135.

When the first refrigerant circuit 135 is engaged with the glycol loop 127, the outside air temperature has increased and/or the outside air temperature is not cool enough to provide sufficient cooling to the cooling load. In this mode of operation, the liquid cooling fluid within liquid cooling fluid loop 124 may be cooled by both the glycol loop 127 and the first refrigerant circuit 135. Specifically, the liquid cooling fluid of the liquid cooling fluid loop 124 may transfer heat to the freeze-protected fluid circulating within glycol loop 127. The freeze-protected fluid may then release the heat absorbed from the cooling fluid to ambient air as the freeze-protected fluid flows through glycol coil 220. After the liquid cooling fluid 230 has been cooled by the freeze-protected fluid within heat exchanger 218, the liquid cooling fluid 236 may then flow through cooler 208 of the first refrigerant circuit 135 where first refrigerant circuit 135 may further remove heat from the liquid cooling fluid 236 by absorbing additional heat from the liquid cooling fluid 236 by the refrigerant in first refrigerant circuit 135. In this manner, both free-cooling loop or glycol loop 127 and first refrigerant circuit 135 may be used to provide cooling capacity during this mode of operation.

When required, the cooling system 120 operates in a third mode or full mechanical cooling mode which utilizes full mechanical cooling. In this mode, the first refrigerant circuit 135 runs as a conventional refrigeration system. If the required load can be satisfied by the operation of only the first refrigerant circuit 135, the second refrigerant circuit 126 will not be engaged. As only the first refrigerant circuit 135 is operating, a lower condensing temperature is achieved. In addition, as the second refrigerant circuit 126 does not operate, operation of the glycol pump is not required.

However, if required, the first refrigerant circuit 135 and the second refrigerant circuit 126 can operate at the same time. In this mode, the first refrigerant circuit 135 runs as a conventional refrigeration system. The second refrigerant circuit 126 may implement a vapor-compression cycle, or other type of cooling cycle, such as absorption or a thermoelectric cycle, to provide additional cooling for the cooling load. The heat generated by the second refrigerant circuit 126 is rejected through the glycol loop 127.

In this third mode the three-way valve 216 of the glycol loop 127 directs glycol to the condenser 212 and prevents flow to the glycol-water heat exchanger 218. This allows the second refrigerant circuit 126 to make use of the glycol coils 220 and the lower air temperatures in the upstream location of the coils to minimize condensing temperature.

Accordingly, during this third mode of operation, heat exchanger 218 is used to transfer heat from second refrigerant circuit 126 to glycol loop 127. Specifically, glycol loop 127 circulates the freeze-protected fluid from heat exchanger

218 to glycol coil 220 to expel the heat into the environment. In this manner, glycol coil 220 may be used by cooling system 120 to remove heat from the system even when the system is not operating in a free-cooling mode. For example, glycol loop 127 may be used to remove heat from second refrigerant circuit 126 even when environmental air temperatures may be higher than the fluid temperature. Specifically, even though the ambient air temperature may be high, for example above 21 degrees Celsius, the ambient air temperature still may be lower than the temperature of the high pressure and temperature refrigerant flowing within the second refrigerant circuit 126. This temperature difference may enable glycol coil 220 to transfer heat from second refrigerant circuit 126 to the environment, thereby increasing the cooling capacity of cooling system 120.

Regardless of the mode of operation, chiller 14 may function to cool the liquid cooling fluid circulating to and from the cooling load. The liquid cooling fluid may enter chiller 14 through a return line 238 that is in fluid communication with the cooling load. A pump 234 circulates the cooling fluid through liquid cooling fluid loop 124. The pump may be any suitable type of pump such as a positive displacement pump, centrifugal pump, or the like.

In the illustrative embodiments, control devices 300 govern operation of the chiller 14 and the cooling system 120 to control the temperature of, including, but not limited to; the fluid in the cooling system as it enters and exits the chiller 14; the freeze-protected fluid entering or leaving the glycol coils 220; and/or the temperature of the fluid entering or leaving the condenser coils 202. For example, the temperature of the freeze-protected fluid entering heat exchanger 218 may be maintained at a certain temperature above freezing to inhibit freezing of the liquid cooling fluid 230 of the liquid cooling fluid loop 124 also circulating within heat exchanger 218. In a specific example, control devices 300 may turn off a motor that drives fan 204 to cease airflow through air-to-liquid glycol coils 220, which in turn may increase the temperature of the freeze-protected fluid entering heat exchanger 218. Control devices 300 may govern operation of the components of the cooling system 120 based on ambient air temperature, temperature of the freeze-protected fluid, temperature of the cooling fluid, time of day, operating times, calendar days, or combinations thereof, among others. Further, the control devices 300 may be coupled to valves, pumps and/or other such equipment and may use information received from sensors to determine when to operate pumps and when to switch positions of valves. Control devices 300 may include local or remote command devices, computer systems and processors, and/or mechanical, electrical, and electromechanical devices that manually or automatically set a temperature related signal that a system receives.

The 300 includes control circuitry, which may include one or more processors with supporting memory circuitry and/or firmware that stores routines carried out by the processor. The processor may be of any suitable type, including, but not limited to, microprocessors, field programmable gate arrays, processors of special purpose and general purpose computers. Similarly, memory might include, but is not limited to, random access memory, flash memory, read only memory. The control devices 300 may also include or be associated with input/output circuitry for receiving sensed signals and interface circuitry for outputting control signals.

Control devices 300 may be configured to switch chiller 14 and the cooling system 120 between the modes of operation based on input received from temperature sensors and the like. A respective temperature sensor may sense the temperature of the ambient outside air and another temperature sensor, which may be disposed within the cooling loop, may sense the temperature of the liquid cooling fluid returning from the building. In certain embodiments, when the ambient air temperature sensed by the first sensor is below the liquid cooling fluid temperature sensed by second sensor, control devices 300 may set cooling system 120 to operate in a mode of operation that employs only free-cooling as described above. Control devices 300 may operate cooling system 120 in the free-cooling mode of operation until the temperature of the ambient air reaches a specified value or is a certain amount above the temperature of the cooling fluid or some other threshold is reached.

Control devices 300 may then set cooling system 120 to operate in the mode of operation that employs first refrigerant circuit 135, in addition to circulating the cooling fluid through the glycol loop 127. Control devices 300 may operate cooling system 120 in this mode of operation until the ambient air temperature reaches another specified value or amount above the liquid cooling fluid temperature or until the liquid cooling fluid temperature rises above a certain threshold. Further, control devices 300 may operate cooling system 120 in this mode of operation until the temperature of the freeze-protected fluid exceeds or approaches the temperature of the cooling fluid. Control devices 300 may then switch cooling system 120 to the fully mechanical mode of operation that employs first refrigerant circuit 135 or a combination of the first refrigerant circuit 135 and the second refrigerant circuit 126.

The control devices 300 may be based on various types of control logic that uses input from temperature sensors. Control devices 300 also may control other valves and pumps included within the chiller 12. Further, additional inputs such as flow rates, pressures, and other temperatures may be used in controlling the operation of chiller 14. For example, other devices may be included in chiller 14, such as additional pressure and/or temperature transducers or switches that sense temperatures and pressures of the refrigerant and cooling fluid, the heat exchangers, the inlet and outlet air, and so forth. Further, the examples provided for determining the mode of operation are not intended to be limiting. Other values and set points based on a variety of factors such as system capacity, cooling load, and the like may be used to switch chiller 14 between the first, second, and third modes of operation.

The configuration of the cooling system 120 is shown by way of example only and is not intended to be limiting. For example, the locations and types of pumps, valves and other components may vary.

Figure 3:
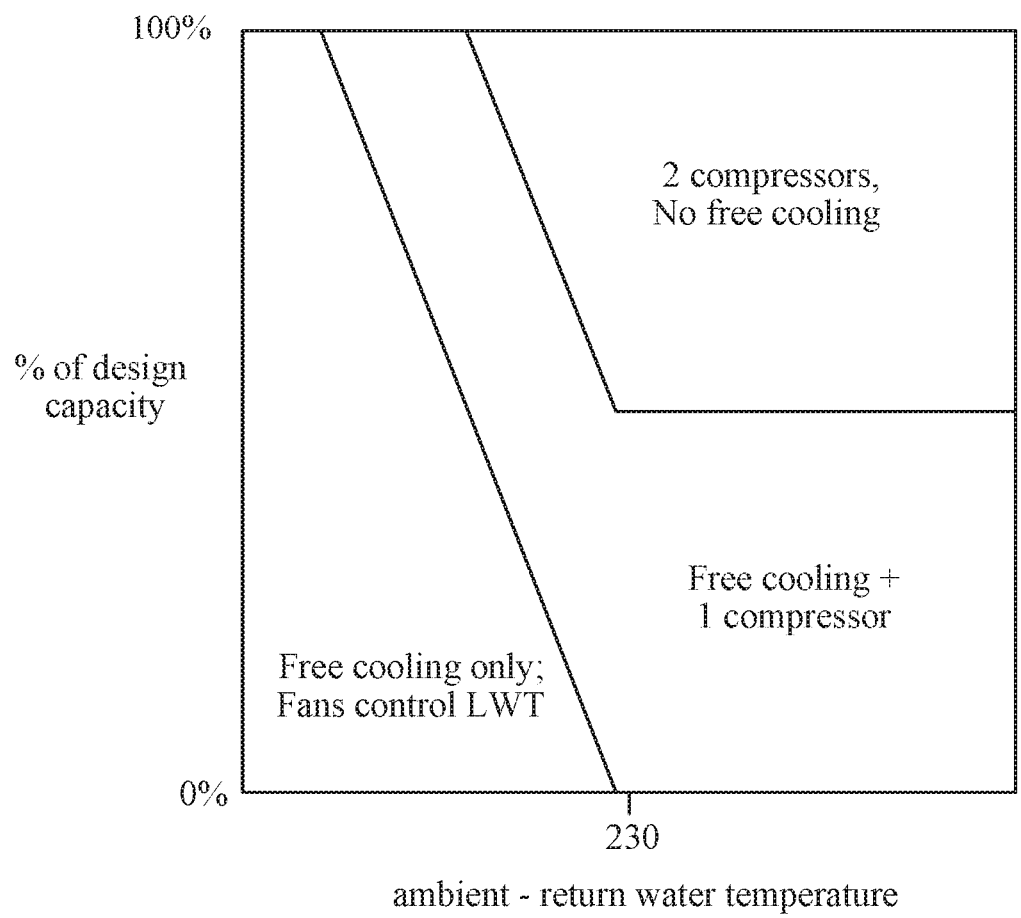
FIG. 3 is a graph of design capacity relative to return water temperature.

FIG. 3 shows the appropriate use of the various modes of operation based on percentage of design capacity relative to ambient/return water temperature. This graph illustrates when it is efficient to use the different modes of operation.

Other variations are possible. For example in cases where glycol is in the chilled water loop, the glycol-water heat exchanger 218 in FIG. 2 may be eliminated and the glycol loop can be connected directly to the liquid cooling fluid loop 124. In this case there would be two connections: one would draw glycol for the glycol coil 220, and the other would return glycol from the coil 220 to a location downstream of the first in free-cooling mode. In mechanical cooling mode the valve 216 would direct glycol flow to the condenser 212 and prevent flow of warm glycol into the liquid cooling fluid loop 124. Additional valves may be included to eliminate any remaining mixing of warm glycol to the cold glycol in mechanical cooling mode. Another variation includes moving the glycol pump 222 to a position upstream of the glycol coil 220.

Other options are possible in the fluids. While the glycol loop would normally use an ethylene or propylene glycol and water solution, water can be used instead of glycol in locations where freezing is not an issue. In that case the glycol-water heat exchanger may be eliminated as described above. Other possible fluids such as calcium chloride or sodium chloride brine or non-aqueous materials such as d-limonene are possible and can be used in the glycol loop or cooling fluid loops depending on the requirements of a particular application.

Many variations are possible in piping for the glycol loop to achieve similar control. For example two two-way valves can replace three-way valve 216 to direct flow to either the glycol to water heat exchanger 216 or the condenser 212. Alternatively, a single one-way valve may be used on the line to the heat exchanger 216 to prevent flow of warm glycol during operation of compressor 210. The location of the valve(s) can be upstream of the heat exchanger 218 and condenser 212 as shown or they can be downstream. The pump 222 may be upstream of the coil or downstream.

If a reversible pump is used for pump 222, then simple check valves can control flow so that pumping in one direction moves glycol through heat exchanger 218 and pumping in the opposite direction moves flow through the condenser 212. Glycol connections for heat exchanger 218 and condenser 212 should be configured to provide counter flow when glycol is moving through them.

Yet another alternative is to use multiple glycol pumps. For example a first pump could be located in the line for heat exchanger 218 and a second pump can be located in the line for the condenser 212. Only one of these two pumps operates a given time. Check valves in the lines can prevent backflow of glycol through pumps when the other pump is operating, although some types of pumps do not allow backflow.

Only certain features and embodiments of the invention have been shown and described in the application and many modifications and changes may occur to those skilled in the art (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the illustrative embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A refrigeration system for use with a liquid cooling fluid loop, the refrigeration system comprising:
   a first refrigerant circuit with a first condenser;
   a second refrigerant circuit with a second condenser;
   a free-cooling loop comprising free-cooling liquid and a free-cooling coil, wherein the free-cooling coil and the first condenser are arranged in series with respect to a common air stream;
   a control device for controlling an operation of the system between a free-cooling-only mode, a free-cooling-plus-mechanical-cooling mode and a full mechanical cooling mode;
   a heat exchanger which cooperates with the free-cooling loop and the liquid cooling fluid loop;
   a cooler which cooperates with the first refrigerant circuit, the second refrigerant circuit and the liquid cooling fluid loop;
   wherein when operating in the free-cooling-only mode, the free-cooling liquid is directed to a heat exchanger and when operating in the full mechanical cooling mode the free-cooling liquid is directed to the second condenser.

2. The system as recited in claim 1, wherein free-cooling liquid provided in the free-cooling loop has a lower freezing point temperature than a liquid cooling fluid circulating in the liquid cooling fluid loop.

3. The system as recited in claim 1, wherein free-cooling liquid provided in the free-cooling loop is a freeze-protected fluid to inhibit freezing during periods of low ambient temperatures.

4. The system as recited in claim 1, wherein only the free-cooling loop cooperates directly with liquid cooling fluid in the liquid cooling fluid loop to cool the liquid cooling fluid when operating in the free-cooling-only mode, and the free-cooling loop interacts with the second refrigerant circuit to reject heat of the second refrigerant circuit through the free-cooling loop when operating in the full mechanical cooling mode.

5. The system as recited in claim 1, wherein the free-cooling coil is upstream of the first condenser.

6. The system as recited in claim 1, wherein the free-cooling coil and the first condenser are mechanically coupled.

7. The system as recited in claim 6, wherein the free-cooling coil and the first condenser are thermodynamically separate.

8. The system as recited in claim 1, wherein the free-cooling coil and the first condenser share one or more cooling fins.

* * * * *